United States Patent [19]

Bihrle, Jr.

[11] 4,015,800
[45] Apr. 5, 1977

[54] AERODYNAMIC SPIN CONTROL DEVICE FOR AIRCRAFT

[76] Inventor: William Bihrle, Jr., 284A Tennis Court Road, Cove Neck, N.Y. 11771

[22] Filed: Apr. 22, 1975

[21] Appl. No.: 570,505

[52] U.S. Cl. .............................. 244/76 R; 244/45 A
[51] Int. Cl.² .......................................... B64C 17/00
[58] Field of Search ............... 244/76 R, 76 B, 82, 244/113, 130, 138 A, 3.23, 3.21, 3.27, 3.26, 3.24, 76 A, 76 C, 191, 177, 3.28, 3.29, 45 A; 102/4

[56] References Cited

UNITED STATES PATENTS

| | | | |
|---|---|---|---|
| 1,201,763 | 10/1916 | Rimailho | 244/3.28 |
| 1,890,190 | 12/1932 | Papp | 244/139 |
| 2,496,083 | 1/1950 | Browning | 244/113 |
| 2,631,797 | 3/1953 | Smith | 244/113 UX |
| 3,004,489 | 10/1961 | Griffith et al. | 244/113 X |
| 3,098,445 | 7/1963 | Jackson | 244/3.28 |
| 3,103,886 | 9/1963 | Popenoe | 244/3.29 |
| 3,188,958 | 6/1965 | Burke et al. | 244/3.29 |
| 3,273,834 | 9/1966 | Bower | 244/138 A |
| 3,578,796 | 5/1971 | Hagler et al. | 244/3.23 |
| 3,642,234 | 2/1972 | Kamber et al. | 244/45 A |

FOREIGN PATENTS OR APPLICATIONS 813,568  5/1959  United Kingdom ............. 244/45 A Primary Examiner—Trygve M. Blix
Assistant Examiner—Galen L. Barefoot
Attorney, Agent, or Firm—Larson, Taylor & Hinds

[57] ABSTRACT

An aerodynamic spin control device or apparatus is provided for high speed aircraft for effecting inherent aerodynamic spin resistance and/or automatic spin recovery for the aircraft. In one embodiment clam shell doors or like devices are pivotably mounted individually and symmetrically at their forward ends in the forebody area of the aircraft so as to be automatically deployable outwardly in response to spin created forces, whereby to change the fuselage yawing moment from pro-spin to anti-spin by changing the flow field over the fuselage forebody at high angles of attack, by effectively changing the geometric characteristics of the forebody. The doors, in their housed or undeployed positions, conform to the normal contour of the forebody of the aircraft and can be armed (i.e. unlocked) manually or automatically. When unlocked, the doors would extend until the centrifugal and aerodynamic forces acting on the doors are in balance. Tether lines, however, are connected to the inside of the doors to limit the outward angular movement of the doors upon deployment to an optimum angle. Weights may be attached to the inside of the doors to ensure automatic deployment in response to low angular accelerations and velocities that might be experienced during the incipient spin motion. As the spin is terminated, aerodynamic forces return the doors to their housed position.

12 Claims, 3 Drawing Figures

AERODYNAMIC SPIN CONTROL DEVICE FOR AIRCRAFT

FIELD OF THE INVENTION

This invention relates to an aerodynamic spin control and recovery apparatus for use in high speed aircraft for effecting inherent aerodynamic spin resistance and/or for regaining control of the aircraft when it is in a spin. In particular, the invention relates to a spin control and recovery device which is particularly suited for use on prototype full-scale spin demonstration fighter aircraft, the apparatus being located at the nose end of the aircraft for deployment from a housed position in response to spin generated forces. The invention is, however, useful in production aircraft for spin prevention and recovery.

BACKGROUND AND SUMMARY OF THE INVENTION

All fighter aircraft projects are contractually required to perform a full-scale spin demonstration program. The purpose of the flight test program is to identify the types of spins that could be encountered inadvertently during future operational usage of the aircraft, and the control techniques that are required to return the aircraft to the normal flight regime. Other purposes for these programs could include the demonstration of aerodynamic configurations that are spin resistant, automatic spin avoidance and/or spin recovery techniques, etc. In any event, spin demonstration aircraft are required now and will be required in the future, and these aircraft must be equipped with an emergency recovery system that is guaranteed to terminate any unrecoverable spin mode that might be encountered.

One spin mode to which modern fighter type aircraft are susceptible is the flat spin, wherein the aircraft exhibit "spinning top" motions. This type of spin usually has a high rate of rotation, an angle of attack between 70° and 90° and effectively no spin radius, the aircraft spinning about an axis that passes through or near the center-of-gravity of the aircraft. To maintain a flat spin, the aircraft must balance the nose-down aerodynamic pitching moment with an opposing gyroscopic pitching moment. The magnitude of the aerodynamic pitching moment is a function of the aircraft configuration, dynamic pressure and angle of attack (usually increasing progressively up to 90° angle of attack). The magnitude of the gyroscopic pitching moment is a function of the mass distribution and the product of the roll and yaw rates generated about the aircraft body axes. In a flat spin, the yaw rate is considerably greater than the roll rate. The yaw rate required for spin equilibrium is determined by the magnitude of the aerodynamic pitching moment and the aircraft mass distribution. The other requirement for spin equilibrium is that the aerodynamic yawing moment about the body yaw axis be zero (actually very slightly propelling, i.e., pro-spin) at this yaw rate. Obtaining a flat spin requires therefore, that a propelling aerodynamic yawing moment be generated at yaw rates below that required for balancing the aerodynamic pitching moment and that the magnitude of this yawing moment decrease (approaching a zero value) as the required yaw rate is attained. If a damping (anti-spin) yawing moment is generated below and at the required yaw rate the flat spin cannot be maintained.

For most aircraft configurations, the pro-spin yawing moment is produced by the forebody of the fuselage, the magnitude of the moment being a function of forebody geometry (i.e. length and type of cross section area), angle of attack and rate of rotation. Because an aircraft usually cannot recover from a developed flat spin through manipulation of the available aerodynamic controls, it is the spin which pilots fear most. It would obviously be desirable that this type of spin motion be made unattainable through use of some aerodynamic device, which would also facilitate recovery from this spin mode when encountered.

Emergency recovery systems used to date to generate an anti-spin yawing moment are complex, and usually incorporate a tail chute which is extremely inefficient when installed on modern aircraft that spin flat. In some instances, the chute size which is required for a particular type aircraft becomes impracticably large. In addition, the length of the riser line that attaches the tail chute to the aircraft is critical. If the riser line length is too short, the chute tends to collapse in the low dynamic pressure and reversed flow field that exists above the aircraft. If the riser line length is too long, the chute trails the aircraft at an angle which results in a nosedown pitching moment but no anti-spin yawing moment. Even the optimum riser line length results in a chute trail angle that contributes only a small anti-spin yawing moment. To compensate for the small anti-spin yawing moment, large parachutes are used. However, the use of large chutes results in off-design loads on the aircraft, which necessitates extensive internal and external reinforcement of the fuselage. In some cases, the reinforcement of the fuselage incurs changes in the mass distribution and external shape of the spin demonstration aircraft which jeopardizes the applicability of the results obtained from the testing. Some spin demonstration aircraft, therefore, require another device or arrangement to assist or replace the present emergency recovery tail chute system, and it would be desirable that this type of spin motion be made unattainable through use of an aerodynamic device in production aircraft.

The present invention provides a light weight and relatively inexpensive device or apparatus that can be easily installed on full-scale spin demonstration aircraft, yet is still highly effective in the recovery from a flat spin. The device can be armed either by the pilot of the aircraft, or can be automatically armed or controlled by a system that employs an air data computer which considers the yaw rate of the aircraft and/or the angle of attack of the aircraft. Once the device is armed, one embodiment automatically deploys when the nose section of the aircraft is subjected to the centrifugal force experienced in a spin. Thus, the present invention provides a spin recovery device which deploys passively (i.e., without an affirmative external action), and which is substantially completely reliable. An alternative arrangement or method could involve deployment by hydraulic actuators, for example, activated by an air data computer in response to spin forces or incipient spin conditions, or activated by the pilot.

In operation the invention converts the sign (direction) of the fuselage yawing moment from pro-spin (propelling) to anti-spin (damping) by changing the flow field over the fuselage forebody at very high angles of attack, this being accomplished by effectively changing the geometric characteristics of the forebody. In this manner the direction or magnitude of the side force developed on the forebody of the fuselage is modified, and consequently the overall yawing moment of the fuselage.

The spin control or recovery device comprises in combination with the high speed aircraft, spin control means generally located at the forebody of the aircraft for deploying, from a housed position, outwardly away from the normal contour of the nose of the aircraft in response to spin forces, such as the centrifugal force generated by the spin, or incipient spin conditions (spin imminent). In one preferred embodiment of the invention, the device comprises first and second outwardly convex clam shell flaps or doors which are pivotally mounted at the forward ends thereof on the nose of the aircraft in opposed symmetrical relationship about the longitudinal axis of the aircraft. Tether lines or other devices may be coupled to the doors to limit the outward angular movement of the doors to an optimum value upon deployment thereof, and means for locking the doors in the housed position may be provided.

Other features and advantages of the invention will be set forth in or apparent from the following detailed description of a presently preferred embodiment, taken in conjunction with the appended drawings.

DESCRIPTION OF THE PREFERRED EMBODIMENT

Figure 1:
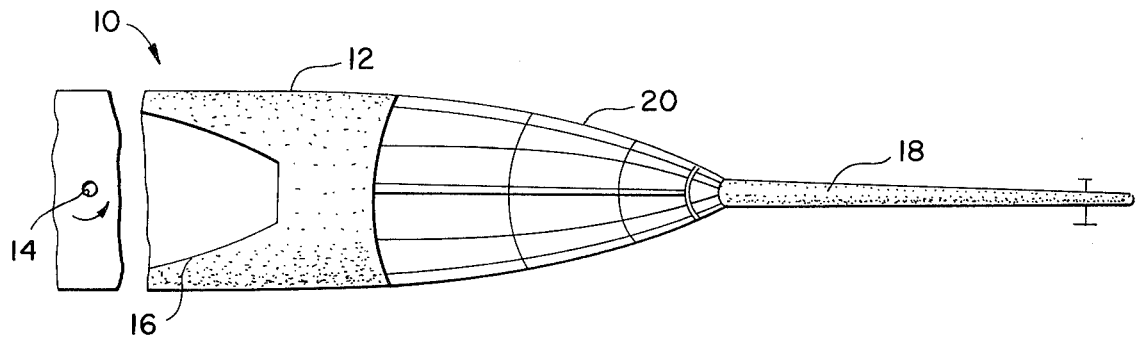
FIG. 1 is a top plan view of part of an aircraft incorporating one embodiment of the instant invention, the spin control device being shown in the housed position.
Figure 2:
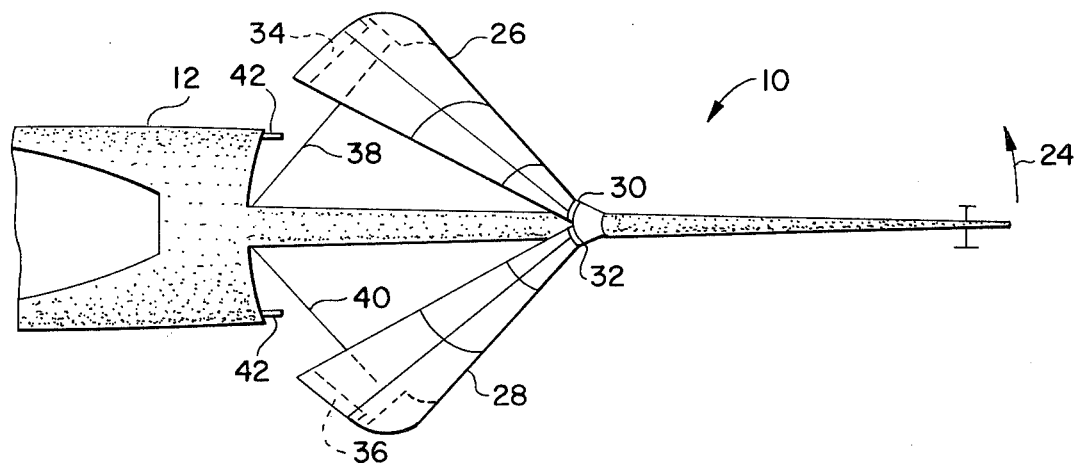
FIG. 2 is a top plan view, similar to FIG. 1, showing the spin control device in the deployed position.

With reference to FIGS. 1 and 2, the forward portion of a high speed spin demonstration aircraft, such as a high performance fighter prototype aircraft, is denoted by reference character 10, and is shown with a spin control device according to the instant invention. Aircraft 10 includes fuselage forebody 12 and a center-of-gravity shown at 14 located appreciably aft of the forebody 12. Because of the characteristics of the spin, the axis about which the aircraft 10 rotates passes through the center-of-gravity 14. Fuselage forebody 12 has a canopy 16 mounted thereon and an instrument nose boom 18 extending forwardly therefrom. Fuselage forebody 12 includes nose 20, which is a radome which houses the radar of an operational aircraft, but which is conventionally unused space in a spin demonstration aircraft.

The spin control device of the invention is comprised, in the illustrated embodiment, of first and second outwardly convex clam shell doors or flaps, respectively denoted 26 and 28, which in the housed position thereof substantially encompass the circumference of nose 20 and conform to the normal contour thereof. Doors 26 and 28 are individually and symmetrically attached at their forward ends to the aircraft by hinges 30 and 32, respectively. It will be apparent that the doors and their hinged connections are so located that the doors swing forward when they are deflected outside the normal contour of the fuselage. In a spin demonstration aircraft, these shell doors may be constructed by cutting the skin structure in the fuselage nose area along the vertical plane of symmetry between two selected stations, and around the fuselage circumference at these two stations, the forward station being at the forward end of the nose, and the aft station being rearward thereof but forward of the canopy. Each resulting clam shell door consists, therefore, of one-half the total nose surface area that exists between the selected fuselage stations. The shell doors shown in FIGS. 1 and 2 are the result of splitting a reinforced fiber glass radome in the plane of symmetry, and by locating the forward circumference cut as far forward on the nose as practicable. The illustrative embodiment is not to infer that doors of this device cannot be hinged at a more aft fuselage station, or that the door area need be determined by the size of a radome, or that the doors must necessarily encompass the full fuselage circumference. Also, it will be apparent that the clam shell doors could be constructed as entirely separate doors which are mounted over existing nose structure or nose skin. The illustrated embodiment is the presently preferred embodiment as incorporated in a spin demonstration aircraft, but, as stated, the doors could be separately constructed and mounted, they could be shaped other than outwardly convex, there could be a more aft hinge location, or doors of less area then illustrated in the disclosure. Although a symmetrical arrangement is preferred, the doors could be asymmetrical, and they could be deployed individually or to different extents. Deployment could be by conventional electrohydraulic actuators, either controlled by the pilot or automatically by an air data computer, as will be apparent to persons skilled in the art.

Figure 3:
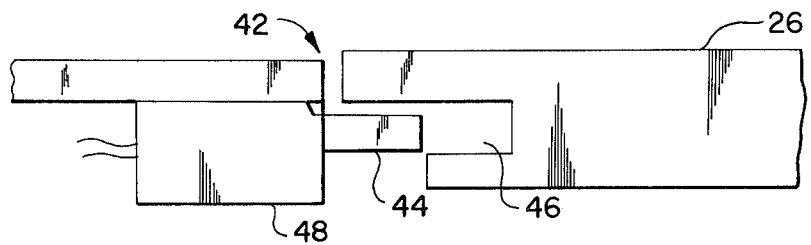
FIG. 3 is a schematic representation of a merely exemplary type of locking means which can be used to retain the spin control device in the housed position.

Weights 34 and 36 may be mounted at the rearward ends of flaps 26 and 28, such weights having the effect of increasing the mass and moment arm of flaps 26 and 28 and thereby assuring deployment of the flaps in response to even low spin rates such that the device would be operational during the incipient spin phase, and therefore serve the function of an aerodynamic spin resistant/prevention device, and during a slow rotating developed spin. Tether lines 38 and 40 may be coupled to the doors 26 and 28 and the fuselage 12 to limit the outward angular movement of the doors or flaps to optimum values. Doors 26 and 28 can be retained in the housed position, as shown in FIG. 1, by a locking mechanism 42, such as that shown in FIG. 3. Locking mechanism 42 may comprise a spring loaded retractable lug 44, shown in the retracted position in FIG. 3, which mates with a slot 46 in the rear end of door 26, for example. If arming of the device is to be accomplished automatically, a suitable actuator such as a solenoid 48 can be utilized to retract lug 44 from engagement with slot 46, thereby unlocking or arming door 26. Of course, a suitable locking or restraining mechanism will be provided for each door. It is to be noted, however, that any of numerous suitable retraining or locking mechanisms may be employed.

In operation, the device can be armed by the pilot before engaging in high angle of attack flight tasks or automatically whenever the aircraft exceeds a selected angle of attack, or angle plus yaw rate, in response to an electronic command signal from an air data computer. Arming the device simply involves unlocking restraining mechanism 42 in order that the two clam shell doors may automatically assume a deflection angle when the nose section of the aircraft is subjected to a centrifugal force. The deflection angle assumed by the shell doors would depend on the rate of aircraft rotation, distance of shells from spin axis, mass and moment center of the shells, dynamic pressure and angle of attack (balance of centrifugal and air loads acting about the shell hinges). The tether lines or other limiting devices will limit the door deflection angles. As the aircraft rate of rotation decreases and the air load on the shells increases during spin recovery, the clam shells will automatically return to their closed position. A spin-off in the opposite direction or a spin re-entry would again cause the clam shells to assume their deflected position. Since the spin prevention-recovery functions are accomplished passively with the device, it requires no hydraulic or electric power, and is consequently a simple and reliable device.

As previously stated, the yawing moment versus rate of rotation characteristic required to generate and maintain a flat spin can be attributed to the contribution of the forebody to the fuselage yawing moment. It is believed that the sign (direction) and magnitude of the yawing moment due to the forebody is a function of forebody geometry, angle of attack and rate of rotation. By activating the clam shell doors, the flow field over the forebody is radically altered, and thereby the yawing moment attributed to this portion of the fuselage.

Although the invention has been described in detail with respect to an exemplary embodiment thereof, it will be understood by those of ordinary skill in the art that variations and modifications may be effected within the scope and spirit of the invention without departing therefrom.

I claim:

1. In a high speed airplane with lifting surfaces, an aerodynamic spin control device for preventing or controlling a spin caused at least in part by the propelling side force generated by the fuselage forebody of said airplane at high angles of attack, said spin control device comprising in combination with said high speed airplane, spin control means located at the forebody area of said airplane for deploying from a housed position laterally outwardly away from the normal contour of the forebody of said airplane in response to spin conditions.

2. In a high speed airplane, an aerodynamic spin control device as claimed in claim 1, wherein said spin control means comprises a first member and a second member respectively pivotably mounted at the forward ends thereof on the forebody of said airplane and extending rearwardly therefrom in opposed symmetrical relationship about the longitudinal body axis of said airplane for deploying in response to centrifugal force generated by the spin, one of said members projecting laterally outwardly in the direction of spin and the other projecting oppositely, upon deployment thereof.

3. In a high speed airplane, an aerodynamic spin control device as claimed in claim 2, wherein said first member and said second member each comprise an outwardly convex member which, in the housed position thereof, conforms to the normal contour of part of the nose of said airplane.

4. In a high speed airplane, an aerodynamic spin control device as claimed in claim 2 wherein said first and second members comprise first and second outwardly convex members which, in the housed position thereof, substantially encompass the circumference of the nose of said airplane, and wherein the outer surface of the nose of said airplane is comprised of said first and second members.

5. In a high speed airplane, an aerodynamic spin control device as claimed in claim 2 and further including weight means mounted on said spin control means so as to increase the mass and moment arm thereof, thereby assuring the deployment of said spin control means in response to a slow rotation motion.

6. In a high speed airplane, an aerodynamic spin control device as claimed in claim 2 and further including means for locking said spin control members in the housed position thereof.

7. In a high speed airplane, an aerodynamic spin control device as claimed in claim 6 wherein said spin control members in the unlocked condition are automatically deployed solely by the response thereof to the centrifugal force generated by the spin.

8. In a high speed airplane, an aerodynamic spin control device as claimed in claim 7 and further including weight means mounted on said spin control members so as to increase the applied moment about the pivot axes thereof, thereby assuring automatic deployment of said spin control members in the unlocked condition thereof in response to a slow angular rate.

9. A method for recovering a high speed airplane as claimed in claim 3 from a spin caused in part by the propelling yawing moment generated by the fuselage forebody of said airplane at high angles of attack, said method comprising deploying said members laterally outwardly and oppositely away from the normal contour of the forebody of said airplane such that the deployed members radically alter the flow field and consequently change the direction of the fuselage yawing moment.

10. Apparatus as claimed in claim 1 wherein said spin control means comprises means for varying the configuration of the forebody of said airplane in response to centrifugal forces generated by rotation about the center of gravity of said airplane.

11. Apparatus as claimed in claim 1 wherein said spin control means deploys laterally outwardly automatically in response to spin conditions.

12. A method for preventing entry into or effecting recovery from a spin of a high speed airplane with lifting surfaces, caused in part by the propelling yawing moment generating by the fuselage forebody of the high speed airplane at high angles of attack, comprising varying the configuration of the forebody in response to predetermined spin conditions to change the flow field over the fuselage forebody so as to change the fuselage yawing moment from pro-spin to anti-spin.

* * * * *